(12) United States Patent
Miyauchi

(10) Patent No.: US 12,720,212 B2
(45) Date of Patent: Aug. 25, 2026

(54) APPARATUS, METHOD FOR CONTROLLING APPARATUS, AND STORAGE MEDIUM

(71) Applicant: CANON KABUSHIKI KAISHA, Tokyo (JP)

(72) Inventor: Satoshi Miyauchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 119 days.

(21) Appl. No.: 18/749,403

(22) Filed: Jun. 20, 2024

(65) Prior Publication Data

US 2024/0430582 A1 Dec. 26, 2024

(30) Foreign Application Priority Data

Jun. 23, 2023 (JP) ................................ 2023-103417

(51) Int. Cl.
*H04N 23/81* (2023.01)
*H04N 23/951* (2023.01)

(52) U.S. Cl.
CPC ........... *H04N 23/81* (2023.01); *H04N 23/951* (2023.01)

(58) Field of Classification Search
CPC .... H04N 23/81; H04N 23/951; H04N 23/745; H04N 23/632; H04N 23/667
See application file for complete search history.

(56) References Cited

U.S. PATENT DOCUMENTS 8,848,070 B2 * 9/2014 Morino ................ H04N 23/745 348/226.1
2007/0153094 A1 * 7/2007 Noyes .................. H04N 23/745 348/E5.041
2017/0366731 A1 * 12/2017 Onodera ................ H04N 23/76
2022/0166916 A1 * 5/2022 Park ..................... H04N 23/745
2022/0353405 A1 * 11/2022 Kobayashi ........... H04N 23/745

FOREIGN PATENT DOCUMENTS

JP 2010098416 A 4/2010
JP 2022130277 A 9/2022

* cited by examiner

*Primary Examiner* — Hung H Lam
(74) *Attorney, Agent, or Firm* — Canon U.S.A., Inc. IP Division

(57) ABSTRACT

An apparatus includes a sensor, a setting unit configured to set control value, a control unit configured to control driving of the sensor, and a detection unit configured to detect a flicker based on a signal output from the sensor, wherein the control unit controls the driving of the sensor to drive the sensor at different frame rates in a case where the signal for detecting the flicker is output from the sensor, and performs, based on the control value, a first control of executing detection processing in a divided manner over a plurality of intervals each between frames in image capturing by the sensor to obtain an image for recording, or a second control of executing the detection processing in an interval between frames in image capturing by the sensor to obtain an image for recording.

20 Claims, 8 Drawing Sheets

FIG.3

| FRAME SPEED [fps] | NUMBER OF IMAGES IN FLICKER DETECTION DRIVE | TYPE OF FLICKER DETECTION DRIVE |
|---|---|---|
| 40 | 3 | 1 |
| 30 | 3 | 1 |
| 20 | 3 | 1 |
| 15 | 3 | 1 |
| 12 | 3 | 1 |
| 10 | 10 | 1 |
| 7.5 | 10 | 1 |
| 5 | 10 | 2 |
| 3 | 10 | 3 |
| 2 | 10 | 3 |
| 1 | 10 | 3 |

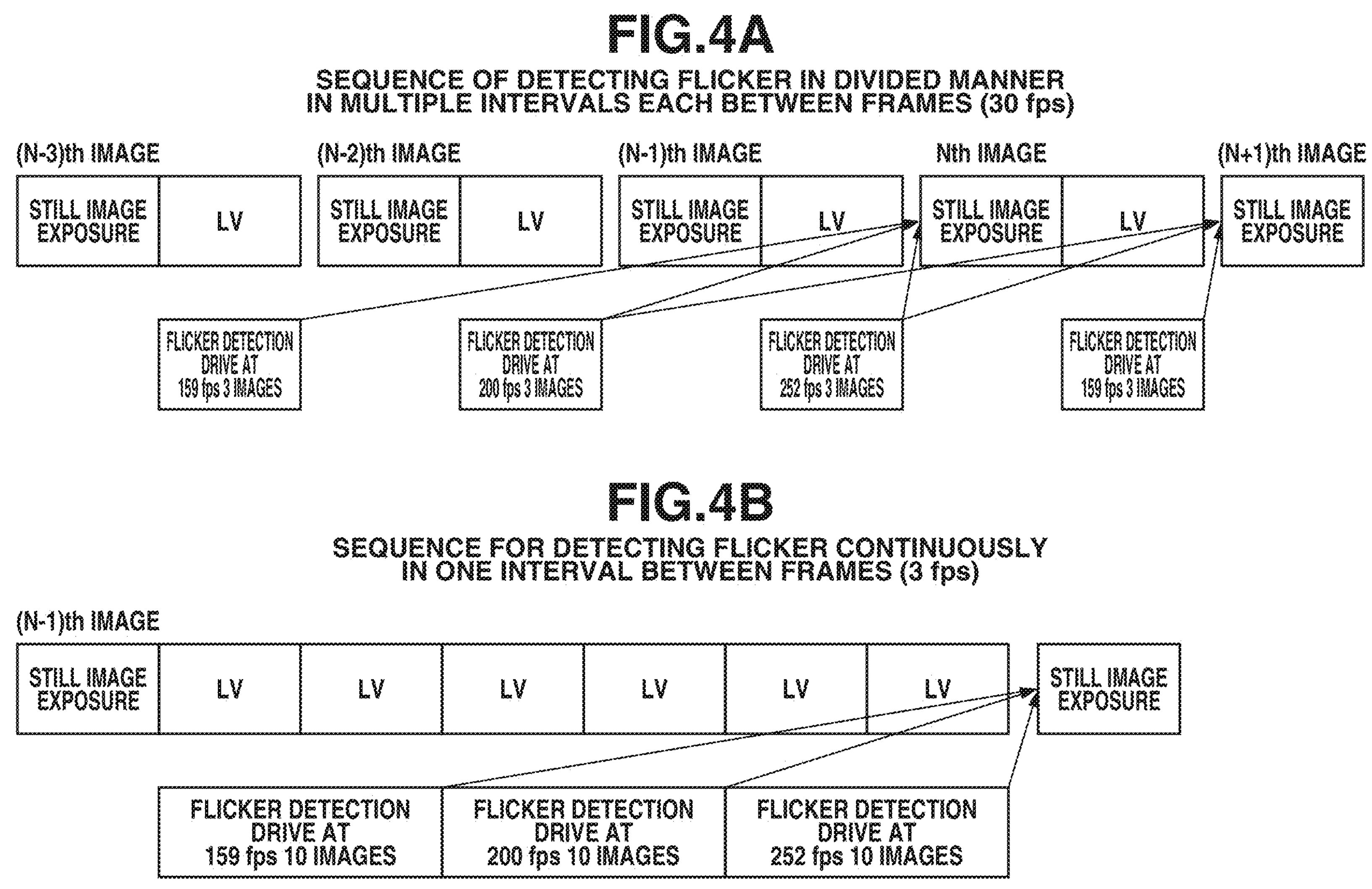

FIG.4A
SEQUENCE OF DETECTING FLICKER IN DIVIDED MANNER
IN MULTIPLE INTERVALS EACH BETWEEN FRAMES (30 fps)
(N-3)th IMAGE
(N-2)th IMAGE
(N-1)th IMAGE
Nth IMAGE
(N+1)th IMAGE
STILL IMAGE EXPOSURE
LV
STILL IMAGE EXPOSURE
LV
STILL IMAGE EXPOSURE
LV
STILL IMAGE EXPOSURE
LV
STILL IMAGE EXPOSURE
FLICKER DETECTION DRIVE AT 159 fps 3 IMAGES
FLICKER DETECTION DRIVE AT 200 fps 3 IMAGES
FLICKER DETECTION DRIVE AT 252 fps 3 IMAGES
FLICKER DETECTION DRIVE AT 159 fps 3 IMAGES
FIG.4B
SEQUENCE FOR DETECTING FLICKER CONTINUOUSLY
IN ONE INTERVAL BETWEEN FRAMES (3 fps)
(N-1)th IMAGE
STILL IMAGE EXPOSURE
LV
LV
LV
LV
LV
LV
STILL IMAGE EXPOSURE
FLICKER DETECTION DRIVE AT 159 fps 10 IMAGES
FLICKER DETECTION DRIVE AT 200 fps 10 IMAGES
FLICKER DETECTION DRIVE AT 252 fps 10 IMAGES

FIG.7

| FRAME SPEED [fps] | NUMBER OF IMAGES IN HIGH FREQUENCY FLICKER DETECTION DRIVE | TYPE OF HIGH FREQUENCY FLICKER DETECTION DRIVE | NUMBER OF IMAGES IN LOW FREQUENCY FLICKER DETECTION DRIVE | TYPE OF LOW FREQUENCY FLICKER DETECTION DRIVE |
|---|---|---|---|---|
| 40 | 3 | 1 | 6 | 1 |
| 30 | 3 | 1 | 6 | 1 |
| 20 | 3 | 1 | 6 | 1 |
| 15 | 3 | 1 | 6 | 1 |
| 12 | 3 | 1 | 6 | 1 |
| 10 | 3 | 2 | 6 | 1 |
| 7.5 | 3 | 3 | 6 | 1 |
| 5 | 3 | 3 | 6 | 1 |
| 3 | 10 | 3 | 6 | 1 |
| 2 | 10 | 3 | 6 | 1 |
| 1 | 10 | 3 | 6 | 1 |

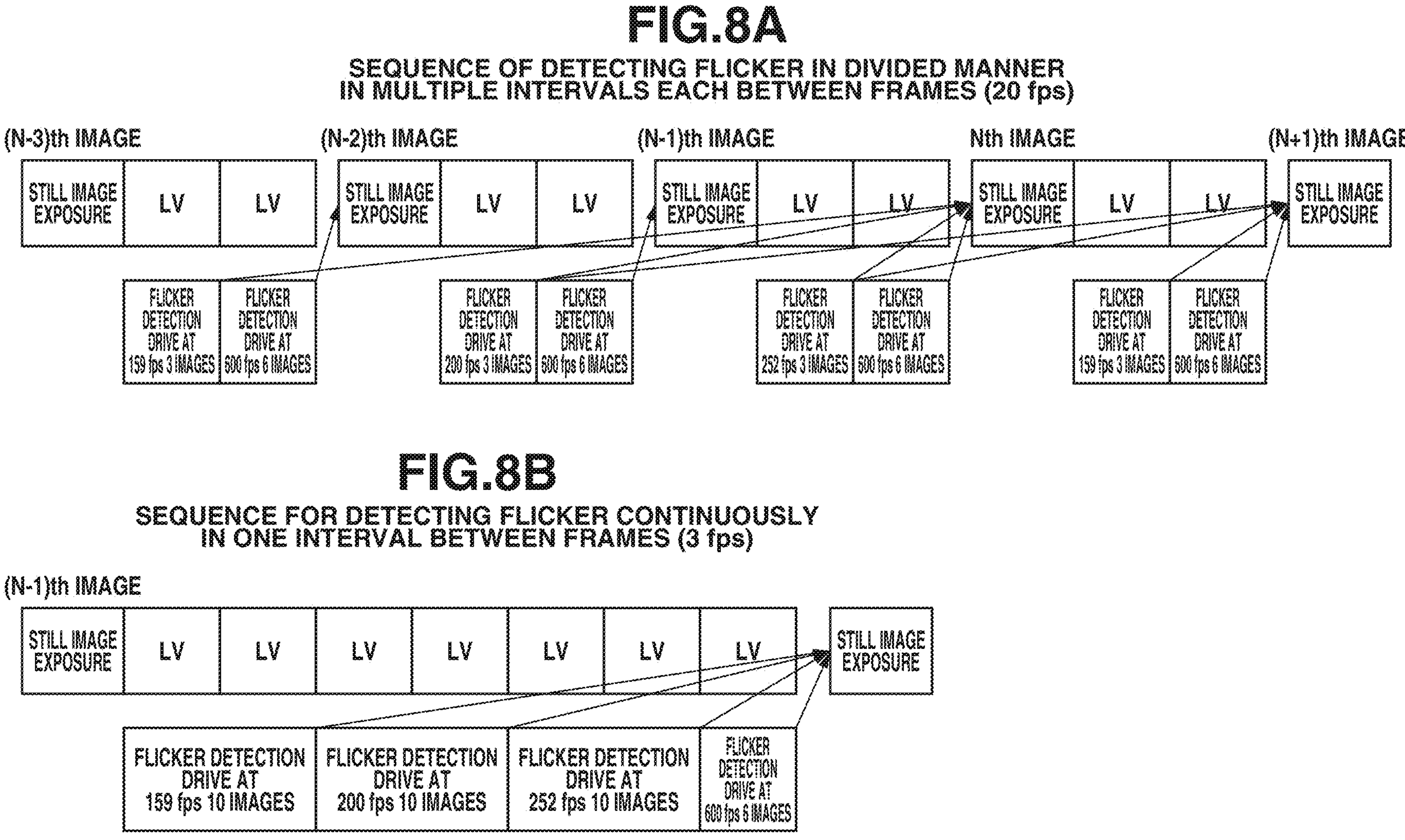
FIG.8A
SEQUENCE OF DETECTING FLICKER IN DIVIDED MANNER IN MULTIPLE INTERVALS EACH BETWEEN FRAMES (20 fps)
(N-3)th IMAGE
(N-2)th IMAGE
(N-1)th IMAGE
Nth IMAGE
(N+1)th IMAGE
STILL IMAGE EXPOSURE
LV
FLICKER DETECTION DRIVE AT 159 fps 3 IMAGES
FLICKER DETECTION DRIVE AT 600 fps 6 IMAGES
FLICKER DETECTION DRIVE AT 200 fps 3 IMAGES
FLICKER DETECTION DRIVE AT 252 fps 3 IMAGES
FIG.8B
SEQUENCE FOR DETECTING FLICKER CONTINUOUSLY IN ONE INTERVAL BETWEEN FRAMES (3 fps)
(N-1)th IMAGE
STILL IMAGE EXPOSURE
LV
FLICKER DETECTION DRIVE AT 159 fps 10 IMAGES
FLICKER DETECTION DRIVE AT 200 fps 10 IMAGES
FLICKER DETECTION DRIVE AT 252 fps 10 IMAGES
FLICKER DETECTION DRIVE AT 600 fps 6 IMAGES

APPARATUS, METHOD FOR CONTROLLING APPARATUS, AND STORAGE MEDIUM

BACKGROUND

Technical Field

The aspect of the embodiments relates to an apparatus, a control method for the apparatus, and a storage medium, and more specifically, to a technique for reducing influences of periodic light quantity changes (i.e., flicker) on an object to perform imaging.

Description of the Related Art

In an imaging apparatus such as a digital camera, exposure nonuniformity or color unevenness may sometimes occur due to periodic blinking (flicker) of a light source in a captured image (screen) depending on a set shutter speed.

For example, it is known that a fluorescent light, which is widely used as an indoor light source, generates a flicker, which is a phenomenon of an illumination light periodically fluctuating due to an influence of the commercial power source frequency. In recent years, the number of light-emitting diode (LED) light sources has been increasing. The LED light source is a high-frequency flickering light source. A method for enabling detection of a frequency of such a high-frequency flicker and a method for reducing an influence on an image are discussed.

For example, Japanese Patent Application Laid-Open No. 2010-98416 discusses a method for obtaining a moving image with few dropped frames while reducing occurrences of a flicker caused by the fluorescent light by alternately switching between different shutter speeds to detect the flicker for every predetermined line of an image sensor in an interval between moving image capturing operations.

In Japanese Patent Application Laid-Open No. 2022-130277, there is discussed a flicker detection method for driving an image sensor at "n" types of frame rates (n is a natural number of 3 or more) to automatically detect a flickering cycle of a high-frequency flickering light source. As described above, there is discussed the method capable of automatically detecting the frequency of a flicker occurring on an object and reducing the influence thereof on an image. However, since the frequency of the high-frequency flickering light source changes depending on the color of the light source, there may be a case where the flicker frequency changes during image capturing. In the technique discussed in Japanese Patent Application Laid-Open No. 2010-98416, since a flicker is detected using two types of shutter speeds, detectable flicker frequencies are limited. Further, in a case where the flicker detection is performed for each image capturing operation during a continuous image capturing as discussed in Japanese Patent Application Laid-Open No. 2022-130277, since the image sensor is driven at three or more frame rates, processing performed between image capturing operations (hereinbelow, referred to as an interval between frames) takes time, and a speed of the continuous image capturing of still images may become slow.

SUMMARY

According to an aspect of the embodiments, an apparatus includes a sensor, and one or more processors that execute a program stored in a memory to function as a setting unit configured to set a control value, a control unit configured to control driving of the sensor, and a detection unit configured to detect a flicker based on a signal output from the sensor, wherein the control unit controls the driving of the sensor to drive the sensor at different frame rates in a case where the signal for detecting the flicker is output from the sensor, wherein the control unit performs, based on the control value, a first control of executing detection processing using the different frame rates in a divided manner over a plurality of intervals each between frames in image capturing by the sensor to obtain an image for recording, or a second control of executing the detection processing using the different frame rates in an interval between frames in image capturing by the sensor to obtain an image for recording, and wherein the detection unit detects the flicker based on the signal for detecting the flicker obtained at each of the frame rates.

Further features of the disclosure will become apparent from the following description of exemplary embodiments with reference to the attached drawings.

BRIEF DESCRIPTION OF THE DRAWINGS

FIG. 3 is a flicker detection drive pattern determination table used for flicker detection in an interval between frames according to the first exemplary embodiment and a second exemplary embodiment.

FIGS. 4A and 4B are diagrams each illustrating a flicker detection sequence corresponding to a frame speed according to the first and second exemplary embodiments.

FIG. 7 is a flicker detection drive pattern determination table used for flicker detection in an interval between frames according to the third second exemplary embodiment.

FIG. 8A is a diagram illustrating a sequence of detecting a flicker in a divided manner in a plurality of intervals each between frames according to the third exemplary embodiment.

FIG. 8B is a diagram illustrating a sequence of continuously detecting a flicker in one interval between frames according to the third exemplary embodiment.

DESCRIPTION OF THE EMBODIMENTS

Figure 1:
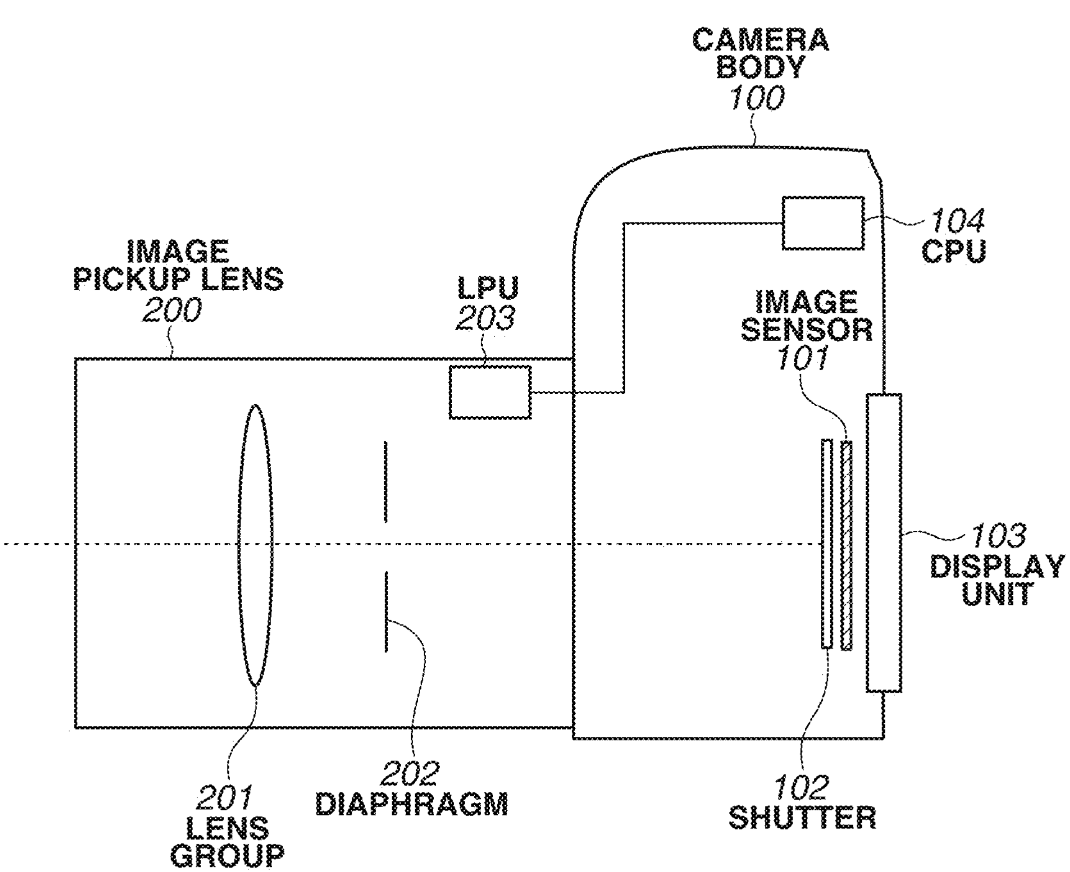
FIG. 1 is a diagram illustrating a system configuration of a digital mirrorless camera.

Hereinbelow, exemplary embodiments will be described in detail with reference to the attached drawings. Note that the exemplary embodiments described below are not intended to limit the disclosure set forth in the claims. In the exemplary embodiments, a plurality of features is described, but not all the features are necessarily essential, and the plurality of features may be freely combined. Further, in the attached drawings, the same or similar components are assigned the same reference numerals, and redundant descriptions thereof are omitted.

In the exemplary embodiments, a digital mirrorless camera is described as an example. However, the aspect of the embodiments can be applied to various kinds of electronic devices as long as the electronic devices each include a live view image display function and/or a moving image capturing function, and the aspect of the embodiments can be applied, for example, to a smartphone, a camcorder, or a game machine with a camera.

FIG. 1 is a diagram illustrating a system configuration of a digital mirrorless camera according to a first exemplary embodiment of the disclosure. The digital mirrorless camera mainly includes a camera body 100 and an image pickup lens 200. The camera body 100 includes an image sensor 101, such as a charge-coupled device (CCD) sensor or a complementary metal-oxide semiconductor (CMOS) sensor, including an infrared cut filter and a low-pass filter, and an object image is formed on a light-receiving surface of the image sensor 101 by the image pickup lens 200. The image sensor 101 photoelectrically converts the formed object image into an electrical signal, and an image obtained based on the electrical signal is used as various images, such as an image for live view display and a captured image for recording. While the electrical signal obtained by the image sensor 101 is an analog signal, the image sensor 101 also has a function of converting the analog signal into a digital value. Based on an image signal output from the image sensor 101, an evaluation value (photometric value) related to brightness of an object can be detected. Further, an exposure time for the image sensor 101 can be controlled based on a shutter speed settable as an exposure control value related to the image sensor 101.

A shutter 102 is a light shielding member that can travel in a direction parallel to a signal scanning direction of the image sensor 101. The exposure time of the image sensor 101 can be controlled by, for example, adjusting an opening for exposure, which is formed of a plurality of shutter blades included in a mechanical shutter, based on the above-described shutter speed. Adjustment of the exposure time according to the present exemplary embodiment can be achieved by using the shutter 102 and/or what is called an electronic shutter that adjusts a signal reset and a reading timing of the image sensor 101.

A display unit 103 includes, for example, a thin-film transistor (TFT) liquid crystal panel. At a time of framing, the display unit 103 displays an image obtained by the image sensor 101 and/or various kinds of imaging setting information in real time to achieve live view (LV). Further, the display unit 103 can display a captured image in response to an operation by a user to allow the user to confirm the captured image. In addition, the display unit 103 according to the present exemplary embodiment includes a resistive or electrostatic capacitance type thin film element called a touch panel, so that the user can use the display unit 103 also as a touch-operable operation unit. By the touch panel detecting a touch operation by the user on an icon or the like displayed on the display unit 103, a function associated with the icon or the like at a touched position is operated. For example, the display unit 103 can display icons related to imaging settings or modes on the touch panel to allow the user to set the imaging settings or the modes by touch operations.

A central processing unit (CPU) 104 is a control unit capable of integrally controlling the camera body 100 and components of accessories attached to the camera body 100. A read only memory (ROM) and a random access memory (RAM) are connected to the CPU 104. The ROM (not illustrated) is a nonvolatile recording element that records programs and various kinds of adjustment parameters used to operate the CPU 104. A program read from the ROM is loaded to a volatile RAM (not illustrated) and executed. In general, a low-speed and low-capacity element is used for the RAM, compared with a frame memory (not illustrated).

Further, the CPU 104 performs calculation related to flicker detection based on an image captured by the image sensor 101. In the calculation related to the flicker detection, the CPU 104 determines whether a flicker has occurred, and obtains a frequency of a flickering light source and a peak timing of a light amount of the flicker, or the like.

The camera body 100 can operate in a drive mode (continuous imaging mode) for continuously performing image capturing while an operation member (not illustrated) for issuing an instruction to start imaging is being pressed. The number of images to be continuously captured per unit time in the drive mode can be set by the user.

The number of images to be continuously captured per unit time in the drive mode is referred to as a frame speed or a continuous imaging speed. The frame speed is set for each mode setting. For example, the continuous imaging speed of 3 frames per second (fps) is set for a low-speed drive mode, the continuous imaging speed of 30 fps is set for a high-speed drive mode, and the continuous imaging speed of 40 fps is set for an ultrahigh-speed drive mode. In the present exemplary embodiment, a description will be given assuming that the user can select from the above-described modes. The continuous imaging speeds of 40 fps, 30 fps, 20 fps, 15 fps, 12 fps, 10 fps, 7.5 fps, 5 fps, 3 fps, 2 fps, and 1 fps can be assigned for the drive modes. The user can change the drive mode during image capturing, for example, by operating the display unit 103.

Next, the image pickup lens 200 will be described.

A lens group 201 includes a focus lens, and focusing can be adjusted by driving the focus lens. In FIG. 1, the lens group 201 is indicated by one lens, but the lens group 201 actually includes a plurality of lenses. An aperture 202 adjusts an amount of light that enters the digital mirrorless camera. A lens CPU (hereinbelow, also referred to as LPU) 203 is a CPU for controlling components of the image pickup lens 200. The LPU 203 can exchange, with the camera body 100, information related to a focus position and the aperture 202 and information related to image stabilization by communicating with the CPU 104 on the camera body 100 side, in addition to controlling the lens group 201 and the aperture 202.

Next, with reference to a flowchart illustrated in FIG. 2, a continuous image capturing according to the first exemplary embodiment will be described. In the following description, known techniques can be used for an acquisition method of a signal for detecting a flicker (hereinbelow, referred to as a flicker detection signal) and a flicker calculation method for detecting a flicker from the flicker detection signal, and thus descriptions thereof are omitted. In the present exemplary embodiment, there are three types of imaging cycles for detecting a flicker (hereinbelow, referred to as a flicker detection drive), which are 159 fps, 200 fps, and 252 fps. In flicker detection processing according to the present exemplary embodiment, the CPU 104 changes the imaging cycle of the image sensor 101 to an imaging cycle (frame rate) for detecting a flicker, and causes the image sensor 101 to obtain a predetermined number of images for each flicker detection drive.

First, in step S100, when the camera body 100 is powered on, the CPU 104 accumulates charge to detect a flicker using the image sensor 101 and obtains a flicker detection signal for detecting a flicker. Then, the CPU 104 performs a flicker calculation for detecting flicker information using the obtained flicker detection signal. In the flicker calculation, the CPU 104 determines whether a flicker has occurred, and in a case where the flicker has occurred, detects a frequency of the flicker (flicker frequency) and a flicker peak timing.

After the above-described detection processing is completed, the processing proceeds to step S101.

In step S101, the CPU 104 checks whether the CPU 104 has received an image capturing instruction operation, such as pressing of a shutter release button, performed by the user. In a case where the CPU 104 has received the image capturing instruction operation (YES in step S101), the processing proceeds to step S102. On the other hand, in a case where the CPU 104 has not received the image capturing instruction operation (NO in step S101), the CPU 104 repeats the processing in step S101. Alternatively, in the case where the CPU 104 has not received the image capturing instruction operation (NO in step S101), the CPU 104 may return the processing to step S100, and execute the flicker detection processing again.

In step S102, the content of the detection processing, which is the flicker detection processing for capturing a first image, performed by the CPU 104 is similar to that in step S100, and thus a description thereof is omitted. After the flicker detection processing is completed, the processing proceeds to step S103.

In step S103, the CPU 104 changes (determines) imaging control values for capturing a first still image. Examples of the imaging control values include a shutter speed, an aperture value, and an International Organization for Standardization (ISO) sensitivity. The imaging control values may be automatically set by the camera body 100, or may be optionally set by a user. The CPU 104 changes the imaging control values to imaging control values that can minimize occurrences of a flicker based on the flicker frequency identified in step S100 or step S102 and the imaging settings. For example, if the identified flicker frequency is 540.0 Hz, the CPU 104 changes the imaging control values so that a still image can be captured with an appropriate exposure by setting the shutter speed to 1/540.0 and changing the aperture value and the ISO sensitivity to match the shutter speed. In a case where the CPU 104 determines that no flicker has occurred as a result of the flicker detection processing in step S100 or step S102, the CPU 104 does not change the imaging control values. After the change (determination) of the imaging control values for capturing the first still image is completed, the processing proceeds to step S104.

In step S104, the CPU 104 controls the image sensor 101 and the shutter 102 based on the imaging control values determined in step S103, and performs still image capturing (recording).

In step S105, the CPU 104 checks whether the image capturing instruction operation performed by the user is continued. In a case where the image capturing instruction operation is continued (YES in step S105), the processing proceeds to step S106. In a case where the image capturing instruction operation is not continued (NO in step S105), the image capturing is ended.

In step S106, the CPU 104 obtains information about the frame speed of the still image capturing as one of the imaging control values from the current imaging settings, and the processing proceeds to step S107. In the present exemplary embodiment, the imaging settings refer to information such as an imaging mode set on the camera body 100, and include information related to the number of images to be continuously captured (frame speed).

In step S107, the CPU 104 obtains information about the number of images required when the flicker detection drive is performed in an interval between frames and a type of the flicker detection drive, with reference to a flicker detection drive pattern determination table used for flicker detection in the interval between frames illustrated in FIG. 3, in accordance with the information about the frame speed obtained in step S106. For example, in a case where the frame speed is set to 30 fps as the high-speed drive mode, the number of images at the time of the flicker detection drive is 3, and the number of types of flicker detection drive is 1. In a case where the frame speed is set to 3 fps as the low-speed drive mode, the number of images at a time of the flicker detection drive is 10, and the number of types of flicker detection drive is 3. It is known that the larger the number of images at the time of the flicker detection drive is, the more the flicker detection performance improves. Thus, the CPU 104 controls the number of images at the time of the flicker detection drive to be increased to improve the flicker detection performance when the set interval between frames is long. For example, in a case where three types of flicker detection drives are performed at once in an interval between frames, the CPU 104 identifies the flicker frequency in the interval between frames and performs image capturing of a next still image based on the identified flicker frequency. Further, in a case where one type or two types of flicker detection drive(s) is/are performed in multiple intervals each between frames, the flicker detection processing is divided. Thus, the CPU 104 identifies the flicker frequency by also using a flicker detection result of one frame or two frames before, and performs the image capturing of the next still image based on the identified flicker frequency.

A flow of the processing from step S108 to step S110 will be described with reference to flicker detection sequences corresponding to frame speeds illustrated in FIGS. 4A and 4B.

In step S108, the CPU 104 performs the flicker detection processing based on a flicker detection drive pattern used in an interval between frames determined in step S107.

For example, in a case where the frame speed is 30 fps, since the number of types of flicker detection pattern drives performed in an interval between frames is one, a sequence of detecting a flicker in a divided manner in a plurality of intervals each between frames as illustrated in FIG. 4A is performed.

The processing in each interval between frames to be performed to capture an $N^{th}$ still image will be described with reference to FIG. 4A. First, the CPU 104 obtains three images by a flicker detection drive at 159 fps after capturing an $(N-3)^{th}$ still image, and analyzes the flicker frequency. Next, the CPU 104 obtains three images by a flicker detection drive at 200 fps after capturing an $(N-2)^{th}$ still image, and analyzes the flicker frequency.

Then, the CPU 104 obtains three images by a flicker detection drive at 252 fps after capturing an $(N-1)^{th}$ still image, and analyzes the flicker frequency. When analysis results of the flicker frequency by the three types of flicker detection drives are obtained, the CPU 104 determines a flicker frequency for capturing the $N^{th}$ still image.

More specifically, the CPU 104 performs different flicker detection drives in the interval between frames after capturing the $(N-3)^{th}$ still image to capturing the $(N-2)^{th}$ still image, in the interval between frames after capturing the $(N-2)^{th}$ still image to capturing the $(N-1)^{th}$ still image, and in the interval between frames after capturing the $(N-1)^{th}$ still image to capturing the $N^{th}$ still image.

In a case where the frame speed is set to 3 fps, since the number of types of flicker detection drives performed in an interval between frames is three, the CPU 104 detects the flicker continuously (collectively) in one interval between frames, as in the sequence illustrated in FIG. 4B.

The processing performed for capturing the $N^{th}$ still image in an interval between frames will be described with reference to FIG. 4B. First, the CPU 104 causes the image sensor 101 to capture 10 images by the flicker detection drive at 159 fps after capturing the $(N-1)^{th}$ still image, and analyzes the flicker frequency. Next, the CPU 104 causes the image sensor 101 to capture 10 images by the flicker detection drive at 200 fps, and analyzes the flicker frequency. Then, the CPU 104 causes the image sensor 101 to capture 10 images by the flicker detection drive at 252 fps, and analyzes the flicker frequency. When analysis results by the three types of flicker detection drives are obtained, the CPU 104 determines the flicker frequency for capturing the $N^{th}$ still image.

In this way, the three types of flicker detection drives used in the present exemplary embodiment are continuously (collectively) performed in the interval between frames after capturing the $(N-1)^{th}$ still image to capturing the $N^{th}$ still image.

In the examples of the frame speeds of 30 fps and 3 fps described above, the order of the flicker detection drives is 159 fps, 200 fps, and 252 fps, but the order of the imaging cycles may be changed. In addition, the frequencies used for the flicker detection drives are not limited thereto.

In step S109, the CPU 104 performs similar processing as that in step S103 to change the imaging control values for capturing a second still image.

In step S110, the CPU 104 controls the image sensor 101 and the shutter 102 in a similar manner to step S104, and captures (records) a still image.

With the processing described above, as illustrated in the flowchart in FIG. 2, in a case where the imaging setting is set to the frame speed faster than or equal to a predetermined speed (predetermined value or more), it is possible to capture images at a high frame speed while reducing occurrences of a flicker by limiting the types of flicker detection drives and the number of images. Further, in a case where the imaging setting is set to the frame speed slower than the predetermined speed, it is possible to keep the frame speed set by the user while improving the flicker detection accuracy by increasing the types of flicker detection drives and the number of images.

As described above, according to the first exemplary embodiment, it is possible to both keep the frame speed and reduce occurrences of a flicker by changing the types of flicker detection drives performed in an interval between frames and the number of images used for detecting a flicker in the imaging settings.

Figure 5:
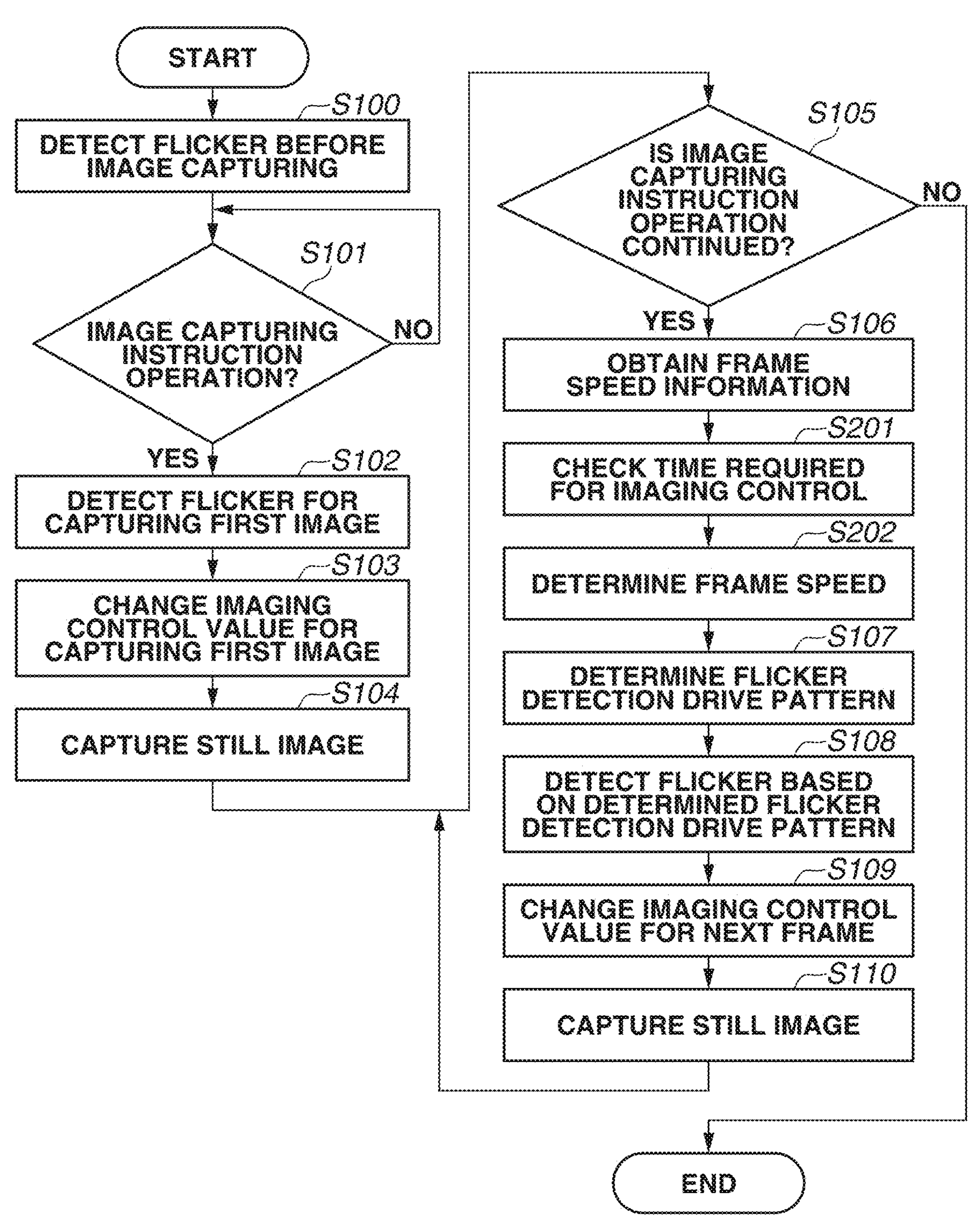
FIG. 5 is a flowchart illustrating a processing procedure of a flickerless image capturing according to the second exemplary embodiment.

Next, with reference to a flowchart illustrated in FIG. 5, a high-frequency flickerless image capturing according to a second exemplary embodiment of the disclosure will be described. Processing in steps S101 to S110 in FIG. 5 is similar to the processing according to the first exemplary embodiment illustrated in FIG. 2, and thus a description thereof is omitted. In the present exemplary embodiment, processing in steps S201 and S202 is added after the processing in step S106.

Figure 2:
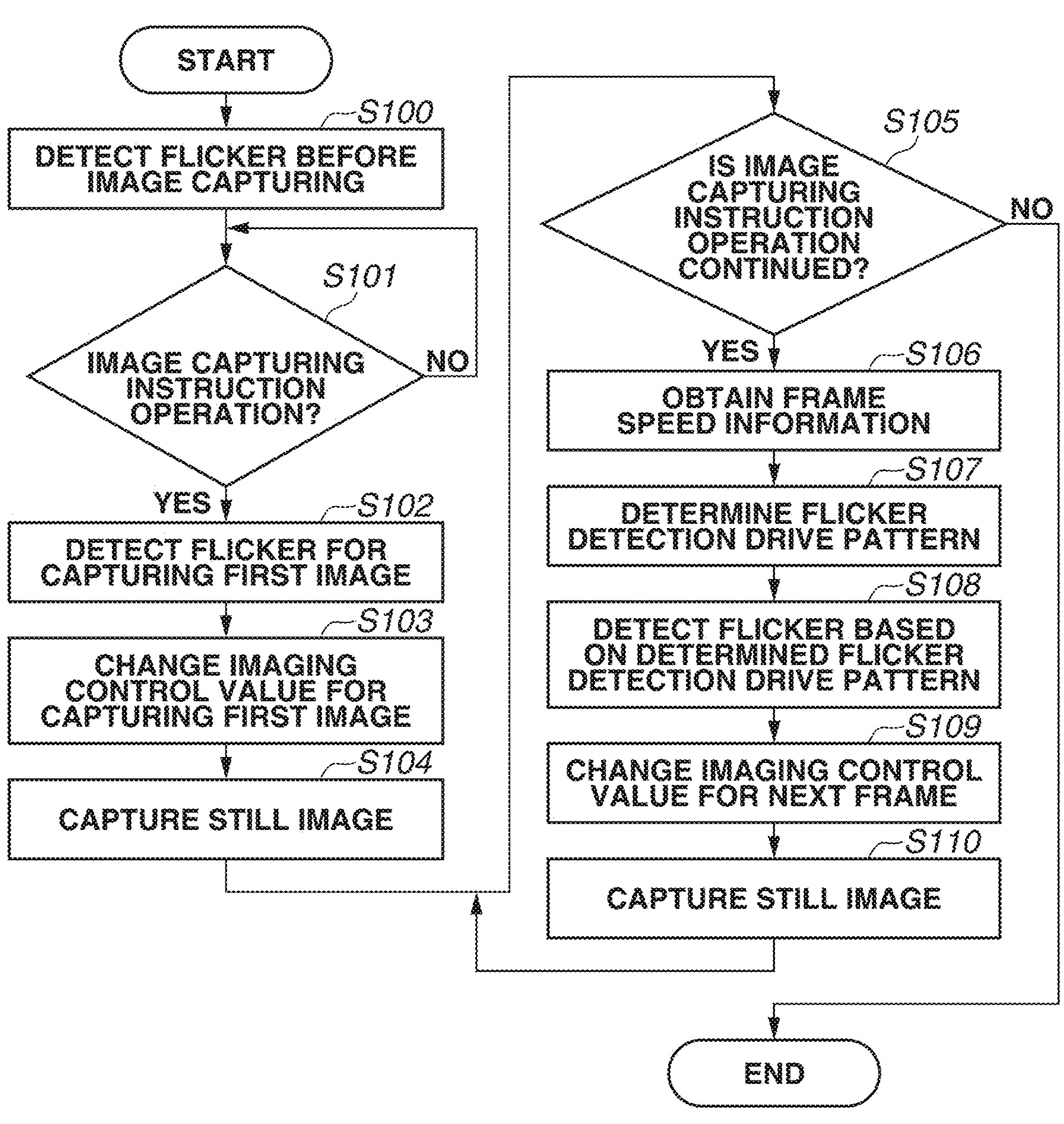
FIG. 2 is a flowchart illustrating a processing procedure of a high-frequency flickerless image capturing according to a first exemplary embodiment.

In the first exemplary embodiment, in step S106 in FIG. 2, the CPU 104 checks (obtains) the information about the frame speed of a still image from the current imaging settings (drive mode or continuous imaging speed). However, an actual frame speed sometimes becomes slower than the frame speed set by the user due to, for example, a live view update speed becoming slower affected by other imaging settings or external light, or the aperture moving to adapt to an exposure change.

Thus, in the present exemplary embodiment, the processing proceeds to step S201 after step S106. In step S201, the CPU 104 checks a time for imaging control required in a case where imaging is performed at an imaging interval based on the frame speed obtained in step S106. The time for imaging control refers to a summation of control times for controls to be performed by the time of the next image capturing, such as a live view update time, an object detection time, and an aperture and focus lens driving time. Factors constituting the time for imaging control are not limited to the items described above, and the CPU 104 obtains the time depending on the imaging control.

In step S202, the CPU 104 compares an imaging interval time based on the frame speed in the imaging settings checked in step S106 with the time for imaging control checked in step S201, and sets the longer of the two as a frame speed for image capturing.

In step S107, the CPU 104 refers to the flicker detection drive pattern determination table used for flicker detection in an interval between frames in FIG. 3, and obtains the number of images and the type of flicker detection drive at a time of a flicker detection drive in the interval between frames based on the frame speed determined in step S202.

As described above, in the present exemplary embodiment, in the case where the actual frame speed becomes slower than the set frame speed, the CPU 104 changes the flicker detection drive pattern. In this way, it is possible to improve the flicker detection accuracy while dealing with a state of the actual frame speed.

Figure 6:
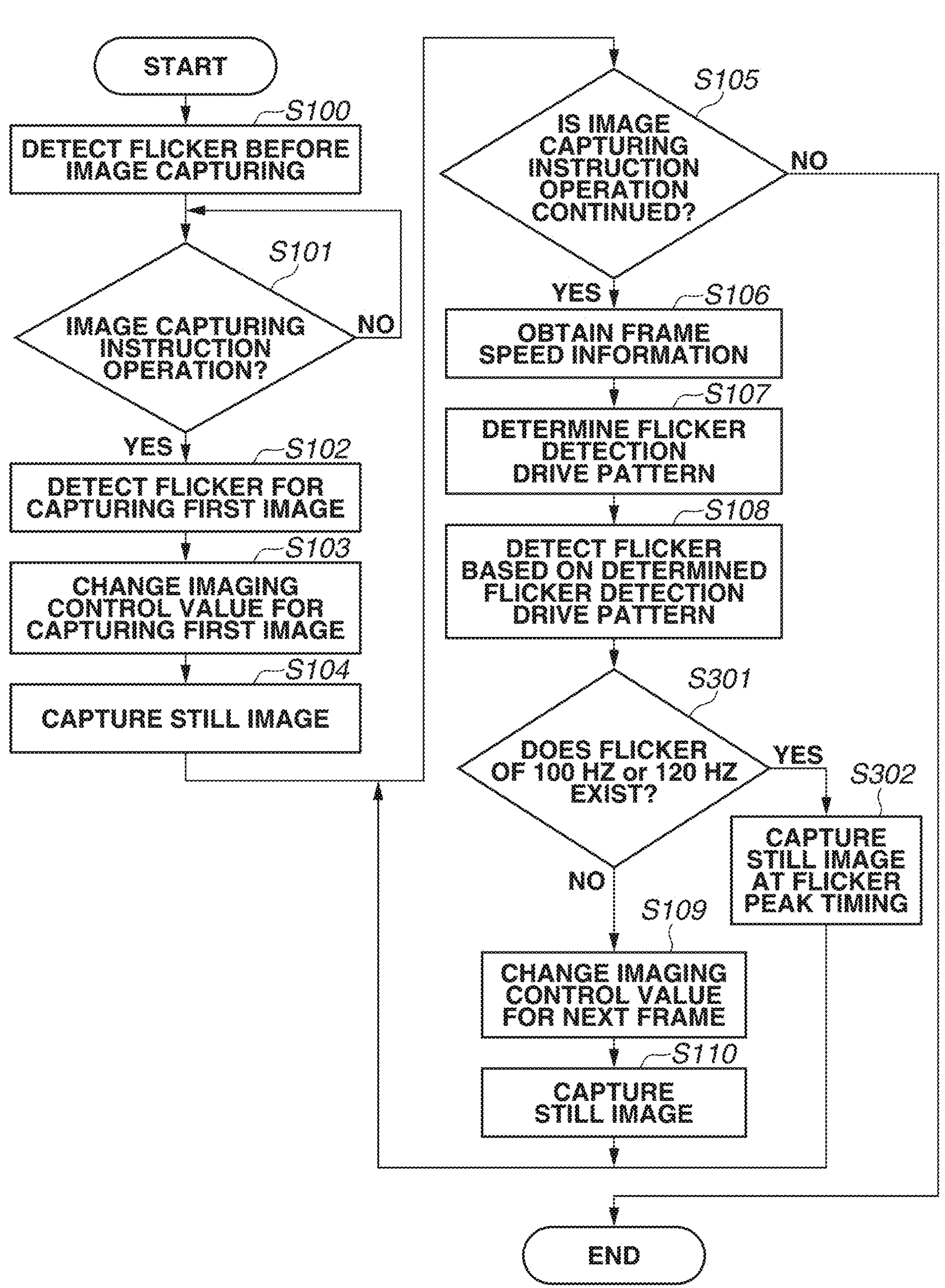
FIG. 6 is a flowchart illustrating a processing procedure of a flickerless image capturing according to a third exemplary embodiment.

Next, with reference to a flowchart illustrated in FIG. 6, a flickerless image capturing according to a third exemplary embodiment will be described. Processing in steps S101 to S110 in FIG. 6 is similar to the processing according to the first exemplary embodiment illustrated in FIG. 2, and thus a description thereof is omitted. In the present exemplary embodiment, processing in step S301 is added after the processing in step S108, and processing in step S302 is added after the processing branches off from step S301.

In the first and second exemplary embodiments described above, the description is given of the example in which the three types of flicker detection drives (drives corresponding to three frequencies) are used to detect the high frequency flicker. The types of the flicker detection drives can be more than three types depending on a range of frequencies that is a detection target. In the present exemplary embodiment, a low frequency flicker detection drive (600 fps) is added to detect a frequency on a low frequency side of 100 Hz or 120 Hz in addition to the high frequency flicker, and thus the number of types of flicker detection drives becomes four.

In step S107, the CPU 104 refers to a flicker detection drive pattern determination table used for flicker detection in an interval between frames in FIG. 7, and obtains the number of images and the types of flicker detection drives at a time of a flicker detection drive in the interval between frames corresponding to the frame speed.

Next, in step S108, the CPU 104 performs the flicker detection processing based on a flicker detection drive pattern used in an interval between frames determined in step S107.

As illustrated in sequences in FIGS. 8A and 8B, the flicker detection drives for detecting the high frequency flicker and the flicker detection drive for detecting the low frequency flicker are performed between still image exposures.

For example, in a case where the frame speed is 20 fps, since the types of the flicker detection drives in each interval between frames are two, the flicker detection sequence is performed in a divided manner in a plurality of intervals each between frames as illustrated in FIG. 8A.

The processing performed for capturing an $N^{th}$ still image in the intervals each between frames will be described with reference to FIG. 8A. First, after capturing an (N−3)$^{th}$ still image, the CPU 104 obtains three images by the flicker detection drive at 159 fps and six images by a flicker detection drive at 600 fps, and analyzes the flicker frequency. Next, after capturing an (N−2)$^{th}$ still image, the CPU 104 obtains three images by the flicker detection drive at 200 fps and six images by the flicker detection drive at 600 fps, and analyzes the flicker frequency. Then, after capturing an (N−1)$^{th}$ still image, the CPU 104 obtains three images by the flicker detection drive at 252 fps and six images by the flicker detection drive at 600 fps, and analyzes the flicker frequency.

When analysis results of the flicker frequency by the four types of flicker detection drives are obtained, the CPU 104 determines the flicker frequency for capturing the N$^{th}$ still image.

More specifically, the CPU 104 executes one of the three types of high frequency flicker detection drives and the low frequency flicker detection drive in the interval between frames after capturing the (N−3)$^{th}$ still image to capturing the (N−2)$^{th}$ still image.

Next, the CPU 104 executes one of the three types of high frequency flicker detection drives that is not executed yet and the low frequency flicker detection drive in the interval between frames after capturing the (N−2)$^{th}$ still image to capturing the (N−1)$^{th}$ still image. Then, the CPU 104 executes the remaining high frequency flicker detection drive and the low frequency flicker detection drive, in the interval between the frames after capturing of the (N−1)$^{th}$ still image to capturing the N$^{th}$ still image.

In a case where the frame speed is set to 3 fps, since the number of types of flicker detection drives in an interval between frames is four, the CPU 104 detects the flicker continuously in one interval between frames as in the sequence illustrated in FIG. 8B.

The processing performed for capturing the N$^{th}$ still image in the interval between frames will be described with reference to FIG. 8B. First, the CPU 104 obtains 10 images by the flicker detection drive at 159 fps after capturing an (N−1)$^{th}$ still image, and analyzes the flicker frequency. Next, the CPU 104 obtains 10 images by the flicker detection drive at 200 fps, and analyzes the flicker frequency. Then, the CPU 104 obtains 10 images by the flicker detection drive at 252 fps, and analyzes the flicker frequency. Then, the CPU 104 obtains six images by the flicker detection drive at 600 fps, and analyzes the flicker frequency. When analysis results by the four types of flicker detection drives are obtained, the CPU 104 determines the flicker frequency for capturing the N$^{th}$ still image.

More specifically, the CPU 104 performs the three types of high frequency flicker detection drives and the low frequency flicker detection drive continuously (collectively) in the interval between frames after capturing the (N−1)$^{th}$ still image to capturing the N$^{th}$ still image.

In the examples of the frame speeds of 20 fps and 3 fps described above, the order of the flicker detection drives is 159 fps, 200 fps, and 252 fps, but the order of the imaging cycles may be changed. In addition, the frequencies used for the flicker detection drives are not limited thereto.

In step S301, the CPU 104 determines whether a flicker of 100 Hz or 120 Hz exists based on a result of the flicker detection processing in the interval between frames in step S108. In a case where no flicker of 100 Hz or 120 Hz exists (NO in step S301), the processing proceeds to step S109. In a case where the flicker of 100 Hz or 120 Hz exists (YES in step S301), the processing proceeds to step S302.

In step S302, the CPU 104 controls the image sensor 101 and the shutter 102 to perform a still image exposure at a timing matching a flicker peak timing. Then, the still image capturing is performed to match a peak of the flicker so as not to cause variations of exposure and color temperature between a plurality of images.

As described above, as illustrated in the flowchart in FIG. 6, it is possible to perform the image capturing with the reduced occurrences of the flicker by increasing the types of flicker detection drives even in the case where the range of detecting the flicker frequency is wide.

In the above-described exemplary embodiments, the control at the time of continuous image capturing of still images is described, but the exemplary embodiments may also be applied to a control at the time of moving image capturing. In this case, the control may be performed by replacing the continuous imaging speed by a frame rate, and the still image exposure corresponds to an exposure of each frame of the moving image.

Further, the disclosure can be realized by processing of supplying a program for implementing one or more functions of the above-described exemplary embodiments to a system or an apparatus via a network or a storage medium, and reading and executing the program by one or more processors in the system or the apparatus.

Further, the aspect of the embodiments can also be realized by a circuit (e.g., application specific integrated circuits (ASIC)) that implements one or more functions.

The exemplary embodiments of the disclosure are described above, but the disclosure is not limited to these exemplary embodiments and can be modified and changed in various manners within the scope of the disclosure.

OTHER EMBODIMENTS

Embodiment(s) of the aspect of the embodiments can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-103417, filed Jun. 23, 2023, which is hereby incorporated by reference herein in its entirety.

What is claimed is:

1. An apparatus comprising:

a sensor; and one or more processors that execute a program stored in a memory to function as:

a setting unit configured to set a control value, a control unit configured to control driving of the sensor, and a detection unit configured to detect a flicker based on a signal output from the sensor, wherein the control unit controls the driving of the sensor to drive the sensor at different frame rates in a case where the signal for detecting the flicker is output from the sensor, wherein the control unit performs, based on the control value, a first control of executing detection processing using the different frame rates in a divided manner over a plurality of intervals each between frames in image capturing by the sensor to obtain an image for recording, or a second control of executing the detection processing using the different frame rates in an interval between frames in image capturing by the sensor to obtain an image for recording, and wherein the detection unit detects the flicker based on the signal for detecting the flicker obtained at each of the frame rates.

2. The apparatus according to claim 1, wherein the control value includes information about a frame speed of the image capturing to obtain the image for recording by the sensor.

3. The apparatus according to claim 2, wherein the control unit controls the sensor by the first control in a case where the frame speed is a predetermined value or more.

4. The apparatus according to claim 1, wherein the setting unit changes the control value based on the detected flicker.

5. The apparatus according to claim 1, wherein the different frame rates are "n" different frame rates ("n" is a natural number of 3 or more).

6. The apparatus according to claim 5, wherein at least one of the "n" different frame rates is a frame rate used to detect i) a high frequency flicker or ii) a flicker of 100 Hz or 120 Hz.

7. The apparatus according to claim 6, wherein, in a case where the control unit performs the first control, the control unit controls the sensor so that the detection processing at a frame rate set for detecting the flicker of 100 Hz or 120 Hz among the "n" different frame rates is performed without fail in each of the plurality of intervals each between frames.

8. A method for controlling an apparatus, the method comprising:

setting a control value;

controlling driving of a sensor;

detecting a flicker based on a signal output from the sensor;

controlling the driving of the sensor to drive the sensor at different frame rates in a case where the signal for detecting the flicker is output from the sensor;

performing, based on the control value, a first control of executing detection processing using the different frame rates in a divided manner over a plurality of intervals each between frames in image capturing to obtain an image for recording, or a second control of executing the detection processing using the different frame rates in an interval between frames in image capturing to obtain an image for recording; and detecting the flicker based on the signal for detecting the flicker obtained at each of the frame rates.

9. The method according to claim 8, wherein the control value includes information about a frame speed of the image capturing to obtain the image for recording by the sensor.

10. The method according to claim 9, wherein the controlling controls the sensor by the first control in a case where the frame speed is a predetermined value or more.

11. The method according to claim 8, wherein the setting changes the control value based on the detected flicker.

12. The method according to claim 8, wherein the different frame rates are "n" different frame rates ("n" is a natural number of 3 or more).

13. The method according to claim 12, wherein at least one of the "n" different frame rates is a frame rate used to detect i) a high frequency flicker or ii) a flicker of 100 Hz or 120 Hz.

14. The method according to claim 13, wherein, in a case where the controlling performs the first control, the controlling controls the sensor so that the detection processing at a frame rate set for detecting the flicker of 100 Hz or 120 Hz among the "n" different frame rates is performed without fail in each of the plurality of intervals each between frames.

15. A non-transitory computer-readable storage medium storing instructions that, when executed by a processor of an apparatus, cause the processor of the apparatus to perform a method, the method comprising:

setting a control value;

controlling driving of a sensor;

detecting a flicker by a detection unit based on a signal output from the sensor;

controlling the driving of the sensor to drive the sensor at different frame rates in a case where the signal for detecting the flicker is output from the sensor;

performing, based on the control value, a first control of executing detection processing using the different frame rates in a divided manner over a plurality of intervals each between frames in image capturing to obtain an image for recording, or a second control of executing the detection processing using the different frame rates in an interval between frames in image capturing to obtain an image for recording; and detecting the flicker based on the signal for detecting the flicker obtained at each of the frame rates.

16. The non-transitory computer-readable storage medium according to claim 15, wherein the control value includes information about a frame speed of the image capturing to obtain the image for recording by the sensor.

17. The non-transitory computer-readable storage medium according to claim 16, wherein the controlling controls the sensor by the first control in a case where the frame speed is a predetermined value or more.

18. The non-transitory computer-readable storage medium according to claim 15, wherein the setting changes the control value based on the detected flicker.

19. The non-transitory computer-readable storage medium according to claim 15, wherein the different frame rates are "n" different frame rates ("n" is a natural number of 3 or more); and wherein at least one of the "n" different frame rates is a frame rate used to detect i) a high frequency flicker or ii) a flicker of 100 Hz or 120 Hz.

20. The non-transitory computer-readable storage medium according to claim 19, wherein, in a case where the controlling performs the first control, the controlling controls the sensor so that the detection processing at a frame rate set for detecting the flicker of 100 Hz or 120 Hz among the "n" different frame rates is performed without fail in each of the plurality of intervals each between frames.

* * * * *